Dec. 24, 1957  R. MILLER  2,817,322
SUPERCHARGED ENGINE
Filed April 30, 1956  5 Sheets-Sheet 3

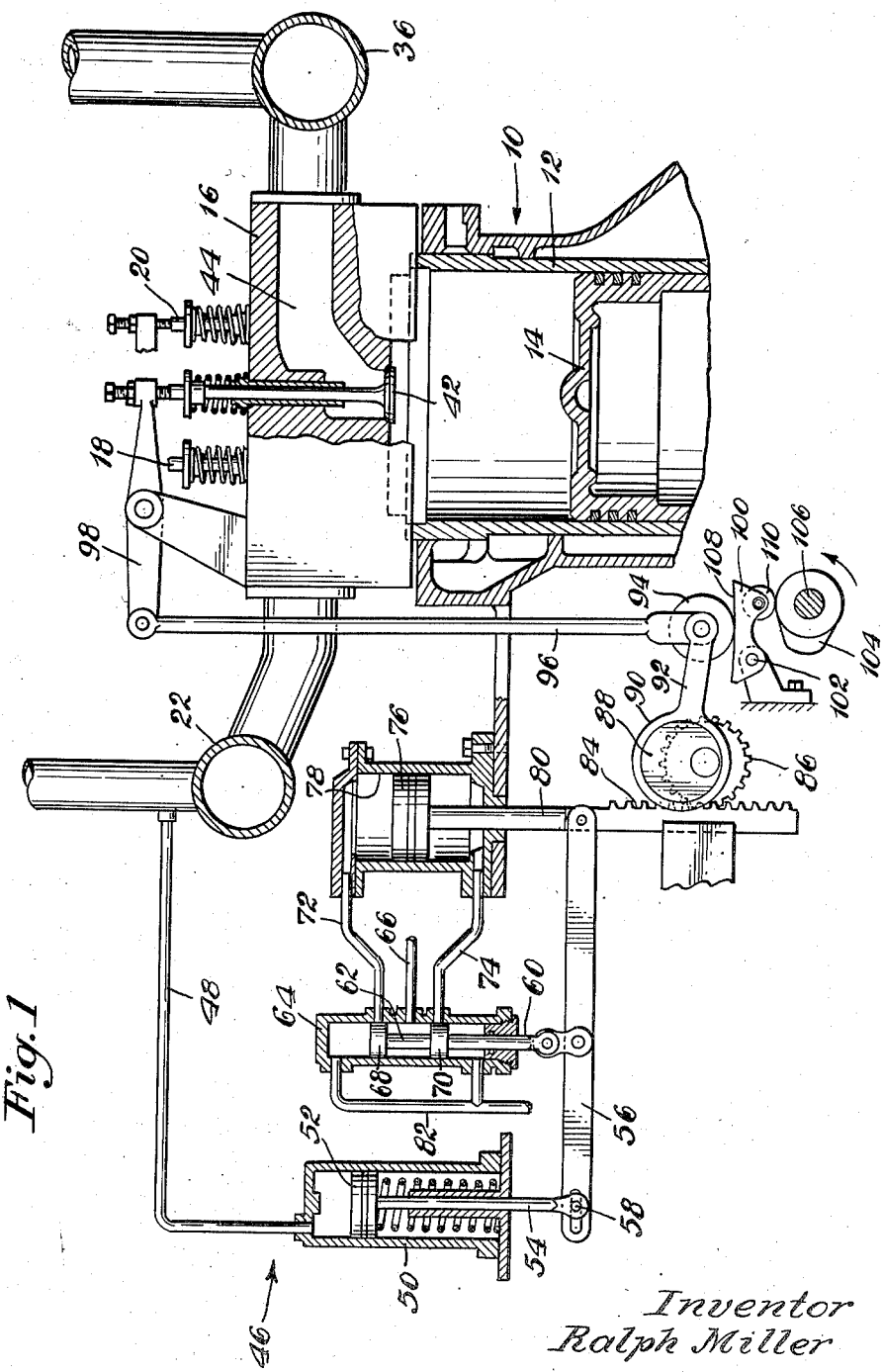

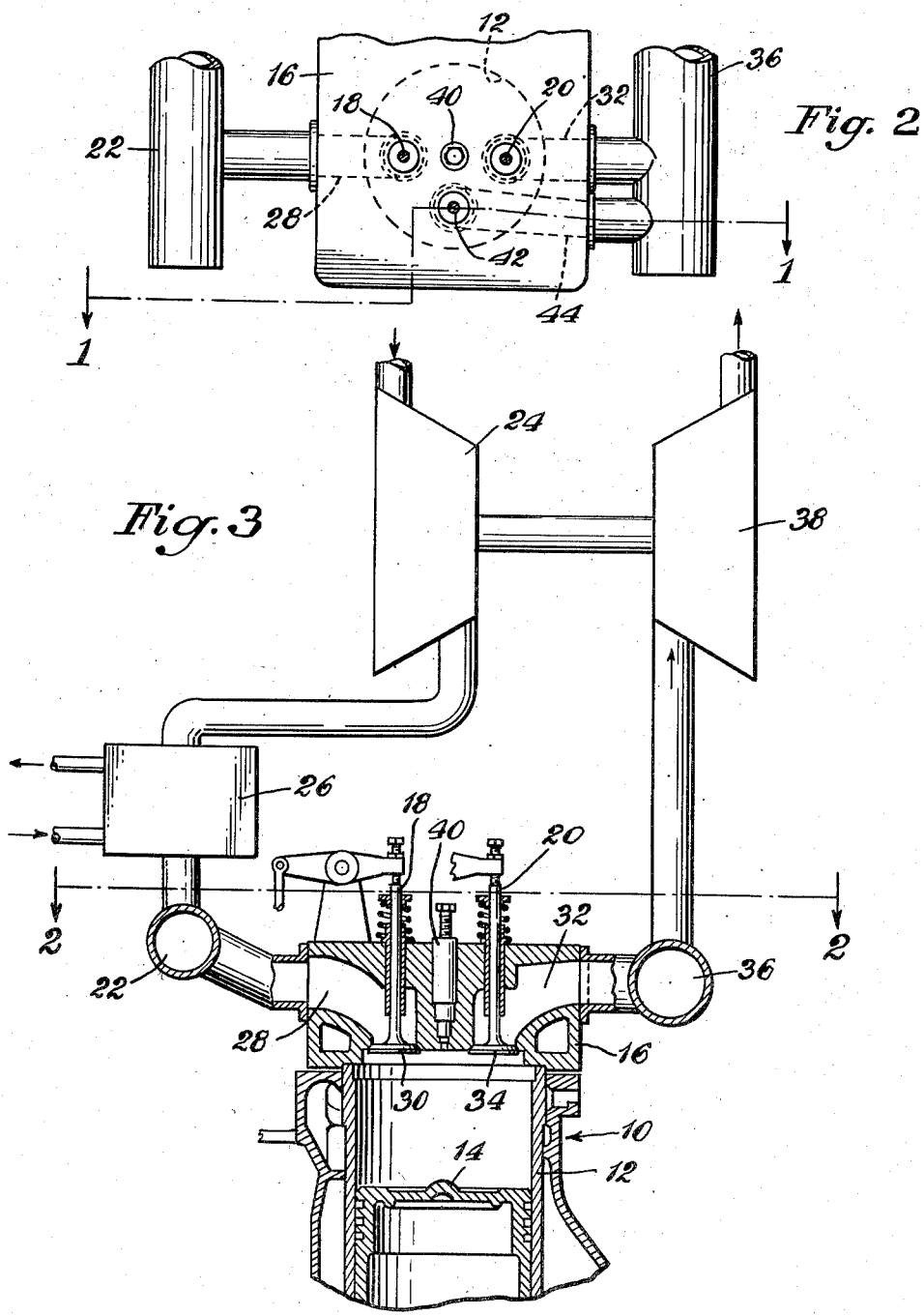

Inventor
Ralph Miller by Parker & Carter
Attorneys

Dec. 24, 1957  R. MILLER  2,817,322
SUPERCHARGED ENGINE
Filed April 30, 1956  5 Sheets-Sheet 4

Inventor
Ralph Miller
by Parker & Carter
Attorneys

Dec. 24, 1957 — R. MILLER — 2,817,322
SUPERCHARGED ENGINE
Filed April 30, 1956 — 5 Sheets-Sheet 5

Inventor
Ralph Miller
by Parker & Carter
Attorneys

United States Patent Office 2,817,322
Patented Dec. 24, 1957

2,817,322

SUPERCHARGED ENGINE

Ralph Miller, Milwaukee, Wis.

Application April 30, 1956, Serial No. 581,713

4 Claims. (Cl. 123—75)

A primary object of this invention is a new and improved method of operating a supercharged intercooled engine.

Another object is a simplified mechanism for operating an engine which is supercharged to a relatively high pressure: for example, two atmospheres or more.

Another object is an improved method of operating an engine so as to control its final compression pressures and temperatures.

Another object is a supercharged, intercooled engine, either two-cycle or four-cycle, with a simplified mechanism for controlling the pressures developed in the engine.

Another object is a supercharged, intercooled engine, either diesel, dual fuel, or gas, operated so as to limit or reduce the engine's thermal load.

Another object is an engine of the above type with an arrangement for improved scavenging.

Another object is an engine of the above type with means for rejecting throttled and controlled quantities of air from the cylinder to result in a controlled net compression ratio.

Other objects will appear from time to time in the ensuing specification and drawings in which:

Figure 1 is a schematic layout, partly in section, of one form of this invention, taken partly along lines 1—1 of Figure 2;

Figure 2 is a partial plan view of the engine taken along lines 2—2 of Figure 3;

Figure 3 is a schematic layout of one form of this engine;

Figure 4:
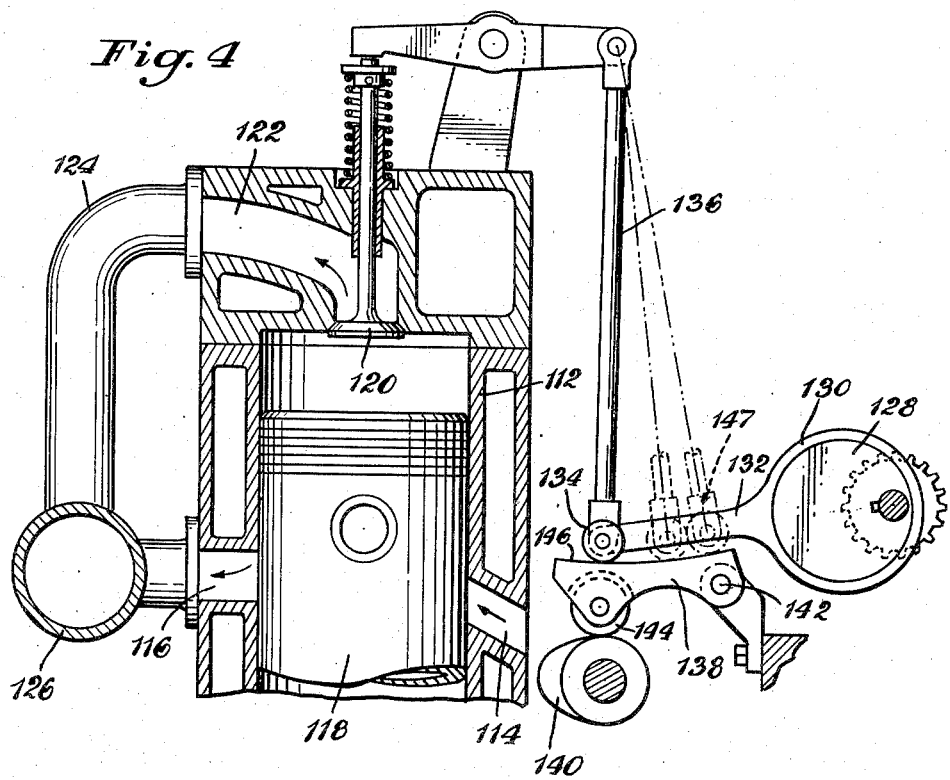
Figure 4 is a modified form of the invention.

In Figure 1 an engine is indicated generally at 10 which includes the usual cylinder 12 and piston 14 of any suitable type. The cylinder head 16 may have the usual inlet valve stem 18 and exhaust valve stem 20. An inlet manifold 22 is supplied with high pressure air from a compressor 24 of a turbocharger unit shown in Figure 3. The air is cooled in a suitable intercooler 26 before it is supplied to the cylinder through a suitable inlet port 28 controlled by the usual inlet valve 30. The burnt products of combustion may be exhausted from the cylinder through a suitable exhaust port 32 controlled by a suitable exhaust valve 34 and collected in an exhaust manifold of the usual type or in any suitable exhaust system. The hot gases may be used to drive a turbine 38 which is coupled, as shown in Figure 3, to the compressor so that the energy of the exhaust gases performs the work of compressing the inlet air.

Any suitable fuel supplying means, indicated at 40 in Figure 3, may be used; and while a fuel injector has been shown, a gas valve could also be suitably disposed in the cylinder head or otherwise. The unit 40, in Figure 3, should be interpreted as broadly representative of any fuel supplying means.

A compression control valve 42 is positioned in the cylinder head and controls a rejection port 44 which is shown in Figures 1 and 2 as connected to the exhaust manifold 36. A control mechanism for this valve, indicated generally at 46 in Figure 1, is constructed to operate the compression control valve in a manner to be set forth hereinbelow.

This control mechanism is one of many that could be used or could be made to function in the desired manner and the specific details form no part of this invention. Suffice it to say for the moment that the valve is closed during the compression stroke of the piston so that air that is normally entrapped in the cylinder, after the closing of the inlet valve, is rejected.

The control mechanism 46 in detail includes a pipe or suitable lead 48 connected to the inlet manifold or one of the pipes or conduits in the inlet side so that the inlet pressure is conveyed to a cylinder 50.

The pressure of air from the blower in the inlet passage will be proportional to load and this variable pressure is conveyed to the cylinder to act against a spring-loaded piston 52. When the pressure is high in the inlet manifold, for example at full load, the piston will be forced down and the piston rod 54, connected to a link 56, through a pin and slot connection 58, will force down the stem 60 of a piston 62 in a cylinder 64. High pressure fluid is connected to this cylinder through a connection 66 and enters between a pair of piston valves 68 and 70. These valves cover the entrance of pipes 72 and 74 so that the high pressure fluid can be alternately supplied to either side of a power piston 76 in a cylinder 78. The link 56 is connected to the piston rod 80 of the power piston, and the control cylinder 64 is vented at each end by suitable pipes 82. This piston rod 80 carries a rack 84 which rotates a pinion 86 mounted on the same shaft with an eccentric 88 surrounded by a strap 90 connected through a suitable arm 92 to a roller follower 94. The follower is on a suitable push rod 96 which, through a conventional rocker arm 98, controls the compression control valve 42.

An auxiliary follower 100, pivoted at 102 to a suitable support, is interposed between a cam 104, on the conventional camshaft 106, and the roller follower 94. The upper surface 108 of the auxiliary follower is struck on an arc about the upper pivot of the push rod so that the roller follower 94 is always in engagement with this surface in any position of the eccentric 88. The auxiliary follower carries a roller 110 in a fixed position so that the time of opening and closing of the control valve will always be the same.

It should be noted, however, that the lift of the valve will be varied, depending upon the position of the follower 94, in response to the inlet air pressure as conveyed through the actuating mechanism 46. For example, in Figure 1, when the eccentric is turned so that the follower 94 is in its extreme right position, the lift of the control valve 42 will be at a maximum, but when the position of the eccentric is such that the follower 94 is in its extreme left position, the lift of the control valve will be at a minimum, if any.

The normal inlet and exhaust valves operate in any conventional manner. The cam 104 may be positioned on the conventional camshaft, and this cam is designed so that the compression control valve is adapted to close during the piston's compression stroke. Thus air that would normally be entrapped for compression in the cylinder will be rejected through the passage 44. The amount of air rejected will be determined by the amount of lift imparted to the control valve by the control mechanism which may respond to the inlet manifold pressure. The time of opening of the compression control valve 42 is also fixed and the cam may be designed to open this valve at any desired time in the engine's cycle to aid in scavenging, or otherwise.

In the previous figures, the invention has been shown on a four-cycle engine and in Figure 4, a two-cycle engine is illustrated. The usual two-cycle cylinder 112 has inlet ports 114 and exhaust ports 116 disposed in any suitable arrangement around the cylinder wall controlled by the piston 118. A compression control valve 120 is disposed in a rejection passage 122 in the cylinder head to reject variable quantities of air through a suitable duct 124 to the exhaust manifold 126. The lift of the control valve is varied by an eccentric 128 surrounded by a strap 130 and connected by an arm 132 to the follower 134 on a push rod 136. An intermediate follower 138 is disposed between an actuating cam 140, driven by the engine crankshaft. The intermediate follower is pivoted at 142 on a suitable support and carries a roller follower 144. The upper surface 146 of the intermediate follower is struck on an arc about the upper pivot of the push rod.

The eccentric may be controlled by a mechanism such as at 46 in Figure 1. Various positions of the follower 134 are shown in broken lines in Figure 4. The lift of the compression control valve may be at a maximum in the full line position in this figure. The lift will decrease as the follower is moved to the right by the eccentric until the lift is a minimum in the position 147.

In the case of two-cycle engines, the valve control mechanism is constructed to close and open the compression control valve at a constant time during the compression stroke of the piston after the exhaust ports have been covered by the piston. This may be used to materially reduce the effective compression, and the amount of lift imparted to the valve 120, which determines the amount of throttling effected in the passage 122, is controlled in response to load.

Figure 5:
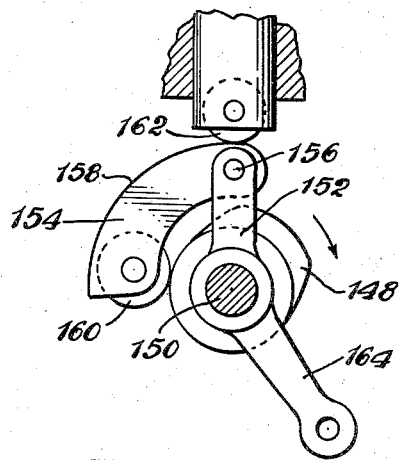
Figure 5 is a further modification.

In Figure 5 a partial variation has been shown. A cam 148 rotated by a shaft 150 is surrounded by a yoke 152 which is pivoted and carries an intermediate follower 154. This follower is pivoted to the yoke at 156 and its upper surface 158 is concentric about the shaft 150. The other end of the intermediate follower carries a roller 160 which rides on the cam 148. The usual follower 162 on a push rod opposes the upper surface 158 of the intermediate follower.

This mechanism is controlled by pivoting the yoke 152 about the cam 148, and for this control any suitable load responsive mechanism could be used. For example, the piston rod 80 in Figure 1 could be tied to the arm 164 of the yoke to move it to any one of the positions between Figure 5 and Figure 6.

Figure 6:
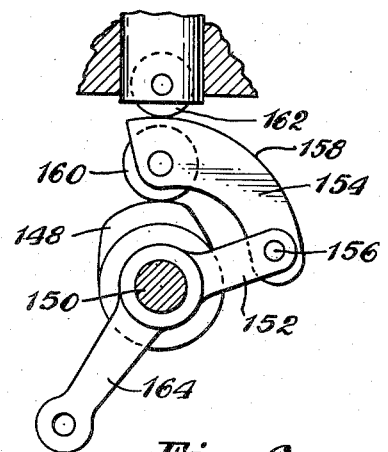
Figure 6 is a different position of the Figure 5 mechanism.

The mechanism in Figures 5 and 6 varies both the lift and the timing of the compression control valve. This mechanism could be used on either a four-cycle engine, as in Figures 1, 2 and 3, or a two-cycle engine, such as in Figure 4. The position of the roller 160 determines the time of opening and closing, and the lift of the follower 162 is determined by its position relative to the pivot 156. For example, in Figure 5 the follower is directly over the pivot 156 and is aligned with that pivot and the camshaft 150. When the cam 148 deflects the follower 160, the intermediate follower will pivot at 156 and will have very little, if any, affect upon the follower 162. In the position of Figure 6, the end of the intermediate follower is positioned between the cam 148 and the follower 162, so that the valve will have a maximum lift. Furthermore, the time of opening and closing of the valve has been materially changed, in this case, retarded, although the reverse could be the case.

Figure 9:
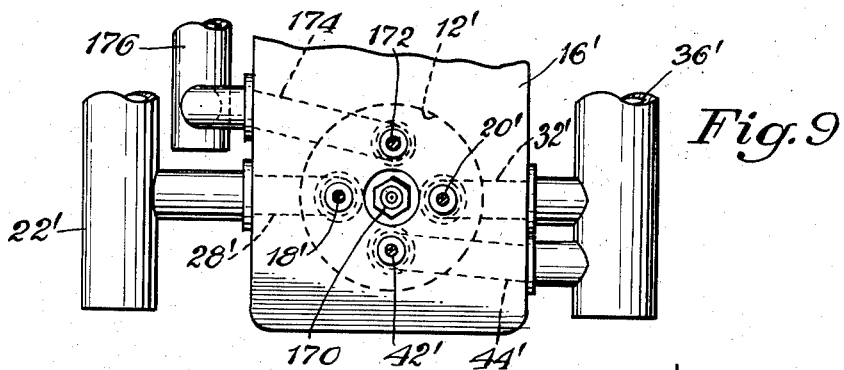
Figure 9 is a partial plan view of a variant form taken along line 9—9 of Figure 10.
Figure 10:
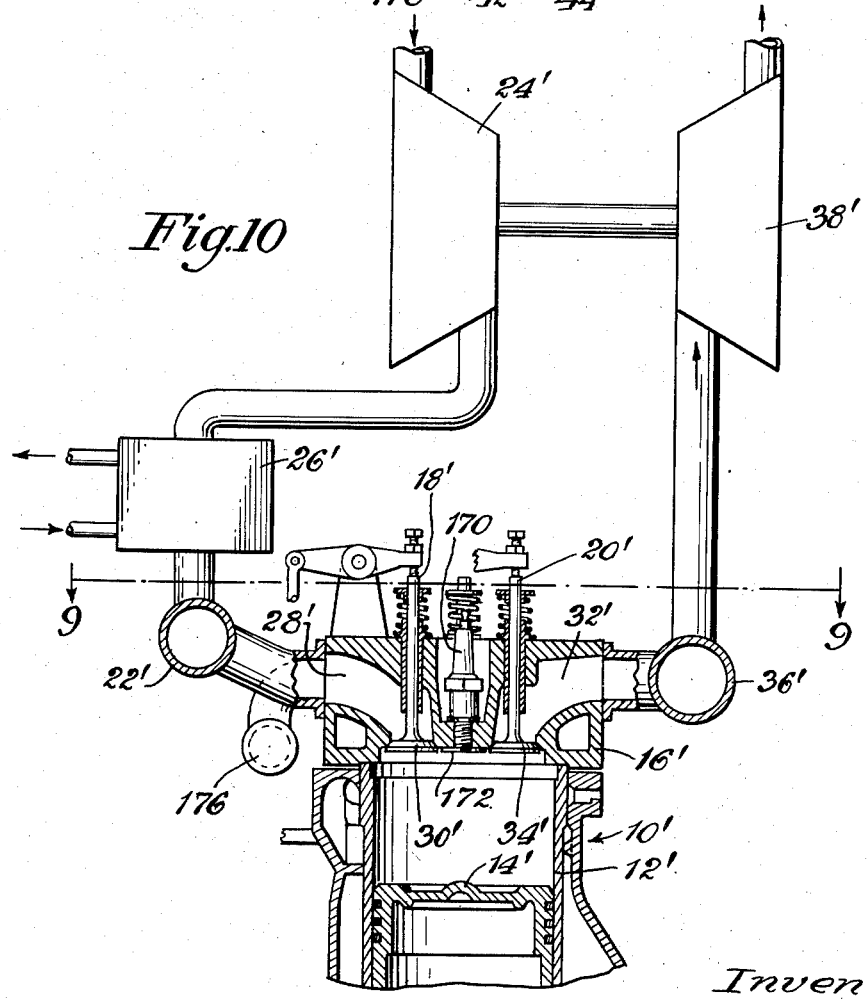
Figure 10 is a schematic layout of the Figure 9 variation.

In Figures 9 and 10 I have shown a variant form which is similar to the form of Figures 2 and 3. Like parts are designated by the same reference numerals except that the numerals have primes. For example, the cylinder is designated 12', the piston 14', the cylinder head 16', and so forth. However, the injector 40 in Figures 2 and 3 has been replaced by a conventional spark plug 170, and a suitable gas valve has been shown at 172 controlling a gas passage 174 connected to a suitable gas header 176 or the like to supply gas fuel to the cylinder. The point is that the invention may be applied equally well to a spark fired gas engine, either 2 cycle or 4 cycle, and the claims should be interpreted accordingly.

The use, operation and function of this invention follow hereinafter with reference principally to Figures 7 and 8.

This invention is concerned with supercharging diesel, dual fuel or gas engines. The engine is intercooled, and the supercharger supplies relatively high pressure air to the engine at full load, for example in excess of 2 atms. abs. A rejection compression control valve is positioned in the cylinder head, so that some of the air which is normally entrapped in the cylinder may be rejected. This reduces the total quantity and volume of air entrapped, and accordingly the final compression pressure and temperature at full load are reduced.

The amount of air that is rejected, and therefore the amount and volume of air that is retained, is controlled by varying the lift of the compression control valve in accordance with the load on the engine. In Figure 1, one mechanism for controlling the lift of the valve has been shown which is responsive to load. But any other suitable mechanism could be used. The same is true of the two-cycle engine shown in Figure 4, as well as the modification in Figures 5 and 6.

The compression control valve acts as a throttle. The amount of lift imparted to this valve varies the amount of throttling.

In either a diesel or dual fuel engine, the lift would be varied in response to load so as to have the maximum lift at full load to reject a large volume of air and thus reduce the entrapped volume, but a minimum lift would be provided at no load, or possibly no lift, so that very little, if any, air would be rejected to give a full cylinder compression. This will insure proper starting and ignition of the fuel at light loads. The above is true of either a two-cycle or four-cycle, diesel or dual fuel operation.

In a gas engine, starting and light load operation is not a problem, but the lift of the valve could be varied so as to provide an approximately constant air-fuel ratio in the cylinder without throttling. The valve would be controlled to have a maximum lift at no load so that the minimum amount of air would be entrapped in the cylinder due to very little throttling by the valve so that the resultant mixture in the cylinder would have an approximately constant air-fuel ratio. At full load, the valve would be given the minimum lift so that very little, if any, air would be rejected to provide the maximum amount of air in the cylinder for mixing with the largest amount of fuel. For a full description of this general type of operation, see my prior Patent #2,773,490 issued December 11, 1956.

In any of the above examples, the valve is operated during the compression stroke of the piston so that at full load, the amount of air entrapped for compression will be substantially less than the full volumetric capacity of the cylinder.

Figure 7:
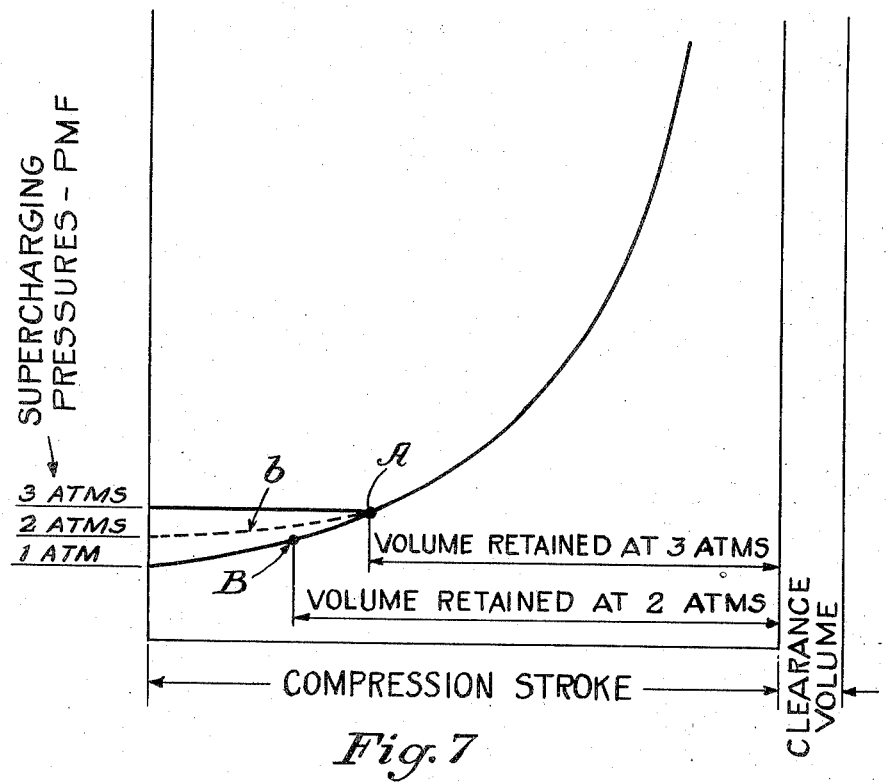
Figure 7 is a pressure-volume diagram.

In Figure 7, various inlet pressures and the volume retained in the cylinder at each of these pressures for a diesel or dual fuel engine have been indicated. The pressure in the cylinder would build up after bottom dead center before the valve closed at the indicated point A due to the throttling effect, and the pressure would generally follow the dotted line indicated in that figure. Assuming that 3 atms. abs. is the full load inlet pressure, the compression control valve would have a maximum lift and very little, if any, throttling would be effected. At the lighter loads, the inlet pressure would be less, for example 2 atms. abs., and the throttling effect due to less valve lift would be greater to bring the pressure up along line b to the point A. If this volume were expanded back to manifold pressure, it would arrive at the point B. While Figure 7 is representative of diesel or dual fuel operation, a similar figure can be visualized for gas operation.

Figure 8:
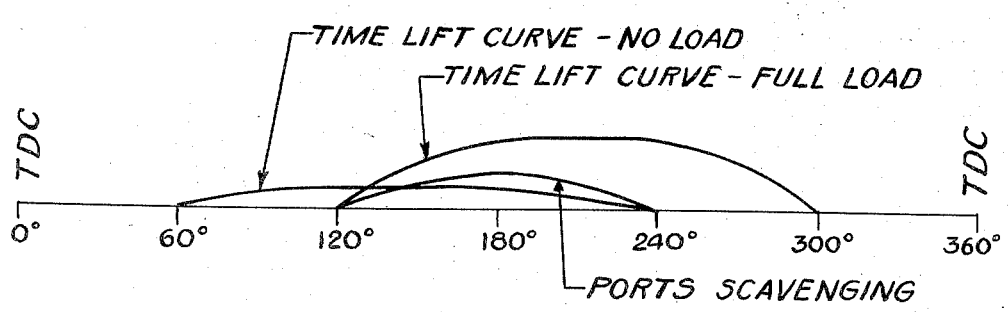
Figure 8 is a valve timing and valve lift diagram.

The valve timing and lift of the Figures 5 and 6 modification is shown in Figure 8 for two-cycle diesel or dual fuel operation. At no load, the valve is constructed to open early, for example 120 degrees before bottom dead center, but has very little lift and closes at 60 degrees after bottom dead center. At full load, the time of closing and opening has been retarded so that the valve now opens at 60 degrees before bottom dead center and closes at 60 degrees before top dead center during the compression stroke and has a maximum lift. Because this is two-cycle operation, opening and closing of the scavenge ports is indicated.

In a four-cycle gas engine the rejection valve could be timed to open shortly before bottom dead center on the suction stroke and close late in the compression stroke. The inlet valve could be closed at about 60° after bottom dead center on the compression stroke. At full load, the rejection valve would have very little, if any, lift and air could be rejected back through the inlet valve until it closed at 60°, thus providing a reduced effective compression. At the lighter loads, air would be rejected in varying amounts through the rejection valve to maintain an approximately constant air-fuel ratio in the cylinders.

While the auxiliary port in the various figures has been shown connected to the exhaust side so that air from the cylinder is rejected to the exhaust in varying amounts in accordance with the throttling effected by the compression control valve, nevertheless this port could be connected to the inlet side at one point or another. For example it could be between the intercooler and the inlet ports, or between the supercharger and the intercooler, if desired. This is true of both two-cycle and four-cycle engines. Generally, the supercharger could be either an exhaust-driven or a crankshaft-driven supercharger. Furthermore, in each case the fuel should be admitted to the cylinder after the compression control valve has either closed or is almost closed and rejection is complete so that fuel will not be lost. Furthermore, while only a port-scavenged, two-cycle engine has been shown in Figure 4, the invention can be applied equally well to a uniflow, two-cycle engine with either exhaust valves or inlet valves in the cylinder head. The same is true of an opposed piston engine.

With these and various other modifications in mind, the invention should be unrestricted except as by the appended claims.

I claim:

1. In an internal combustion engine adapted to operate under varying load conditions including a cylinder, a piston, means for compressing the inlet air, means for cooling the air between the compressing means and the cylinder, means for supplying fuel to the cylinder in quantities that vary in direct relation to the load, and means for varying the amount of air entrapped in the cylinder in relation to the load, including a compression control valve for the cylinder, and an actuating mechanism for the control valve, said actuating mechanism being constructed and arranged to operate the control valve during the piston's compression stroke so that at full load, a substantial amount of air will be rejected from the cylinder and substantially less air than the cylinder's full volumetric capacity will be entrapped, and means for varying the amount of lift of the control valve in accordance with the load to throttle the rejected air so that at the lighter loads, different amounts of air will be rejected to provide different entrapped amounts in the cylinder.

2. The structure of claim 1 in which the means for supplying fuel is an injector, and said last mentioned means is constructed and arranged to provide a maximum lift of the control valve at full load and a minimum lift at no load.

3. The structure of claim 1 in which the fuel supplying means is a gas valve and said last-mentioned means is constructed and arranged so that the control valve has a minimum lift at full load and a maximum lift at no load.

4. The structure of claim 1 in which said last-mentioned means is constructed and arranged to vary both the timing and the lift of the control valve at the same time.

References Cited in the file of this patent

UNITED STATES PATENTS

| | | |
|---|---|---|
| 1,301,807 | Bouteille | Apr. 29, 1919 |
| 1,384,133 | Howe | July 12, 1921 |
| 1,402,573 | Clark | Jan. 3, 1922 |
| 2,292,233 | Lysholm | Aug. 4, 1942 |

FOREIGN PATENTS

| | | |
|---|---|---|
| 735,002 | Germany | May 4, 1943 |